United States Patent [19]

Dusa et al.

[11] Patent Number: 4,466,587
[45] Date of Patent: Aug. 21, 1984

[54] NACELLE INSTALLATION

[75] Inventors: Donald J. Dusa, Cincinnati; Conrad D. Wagenknecht, West Chester, both of Ohio

[73] Assignee: General Electric Company, Cincinnati, Ohio

[21] Appl. No.: 332,893

[22] Filed: Dec. 21, 1981

[51] Int. Cl.³ .................. B64C 1/38; B64D 29/00
[52] U.S. Cl. .................. 244/121; 244/199; 244/130; 244/53 R
[58] Field of Search ............. 244/199, 53 R, 54, 55, 244/130, 121; 239/127.1, 127.3, 265.17, 265.13; 181/220, 213

[56] References Cited

U.S. PATENT DOCUMENTS

| 2,650,752 | 9/1953 | Hoadley | 244/199 |
|---|---|---|---|
| 2,764,373 | 9/1956 | Anderson . | |
| 3,025,667 | 3/1962 | Moorehead | 239/265.13 |
| 3,067,968 | 12/1962 | Heppenstall | 244/53 R |
| 3,442,471 | 12/1966 | Fischer et al. . | |
| 3,806,067 | 4/1974 | Kutney . | |
| 3,833,187 | 9/1974 | Kahler et al. | 244/54 |
| 3,934,675 | 1/1976 | Lear | 181/220 |
| 3,957,206 | 5/1976 | Mason . | |
| 4,049,220 | 9/1977 | Rodgers . | |
| 4,069,977 | 1/1978 | Vaughan . | |
| 4,206,893 | 6/1980 | Howard | 244/54 |
| 4,228,652 | 10/1980 | Short . | |
| 4,238,092 | 12/1980 | Brennan . | |
| 4,314,681 | 2/1982 | Kutney | 244/54 |

FOREIGN PATENT DOCUMENTS 523357 7/1940 United Kingdom ............... 244/130

OTHER PUBLICATIONS

AIAA Paper 80-1196-Short Core Exhaust Nozzle High-Bypass Turbofan Engine.

Primary Examiner—Galen L. Barefoot
Attorney, Agent, or Firm—Francis L. Conte; Gregory A. Welte; Derek P. Lawrence

[57] ABSTRACT

Nacelle installation having devices for constraining hot core exhaust gas from flowing over the trailing portion of a highly swept pylon supporting a high bypass turbofan engine. The devices can comprise a pylon ejector, a core nozzle shroud or a plurality of vortex generators and are disposed generally in the region adjacent the intersection of the core nozzle exit of the engine and the pylon shelf portion of the pylon.

3 Claims, 4 Drawing Figures

NACELLE INSTALLATION

BACKGROUND OF THE INVENTION

This invention relates generally to the field of propulsion system aerodynamics and more specifically to a new and improved nacelle installation for front fan, gas turbine engines for aircraft propulsion.

The performance of new aircraft systems requires an increased emphasis on the installed performance of the propulsion system for providing a more fuel efficient and quieter aircraft. One significant consideration is the interaction between the aircraft and its propulsion system. Installation effects on the propulsion system were shown in the past to have been significant causes of aerodynamic performance losses.

One aircraft and engine interface performance loss area is the aircraft pylon and its attachment to the engine mounting system. In high speed aircraft and especially aircraft where the jet engine is installed relatively close to an aircraft structural member such as a wing, there tends to be interference in the flow of gas from the core exhaust nozzle of the engine with the adjacent aircraft structure. Furthermore, the development of advanced wing shapes and shorter and lighter propulsion systems has led to pylon-engine interface performance problems.

More specifically, for increasing aerodynamic efficiency, the desired mounting and placement of a wing mounted engine nacelle is below and partly forward of the wing and therefore requires highly swept, aerodynamically shaped pylon configurations. The combination of a highly swept pylon and a relatively short nacelle can result in hot exhaust gas upwash over the pylon trailing portion.

Furthermore, the undesirable interference known as base drag which is accompanied by a low pressure zone can exist between the engine and the aircraft. Hot exhaust gas upwash over and drag on the pylon can reduce aerodynamic performance and possibly adversely affect pylon panel structural integrity. More specifically, where the pylon skin or panel structure comprises fiberglass or the like, the hot exhaust gas upwash flowing over the fiberglass pylon panels can reduce the panel strength and lead to aerodynamically induced vibrations and fatigue thereof.

SUMMARY OF THE INVENTION

Accordingly, it is an object of the present invention to provide a new and improved nacelle installation having improved aerodynamic performance.

Another object of the present invention is to provide a new and improved nacelle installation which reduces hot exhaust gas upwash over the pylon.

Briefly stated, one form of the invention is directed to a nacelle installation including a gas turbine engine having a core engine and a core cowl surrounding the core engine and defining a core exhaust nozzle for discharging exhaust gases. A pylon is provided for supporting the engine and has a trailing portion extending aft of the core exhaust nozzle. Means effective for constraining the exhaust gases flowing from the core exhaust nozzle to reduce flow thereof over the trailing portion of the pylon are disclosed.

DESCRIPTION OF THE DRAWING

The invention, together with further objects and advantages thereof, is more particularly disclosed in the following detailed description taken in conjunction with the accompanying drawing, in which.

DETAILED DESCRIPTION

Figure 1:
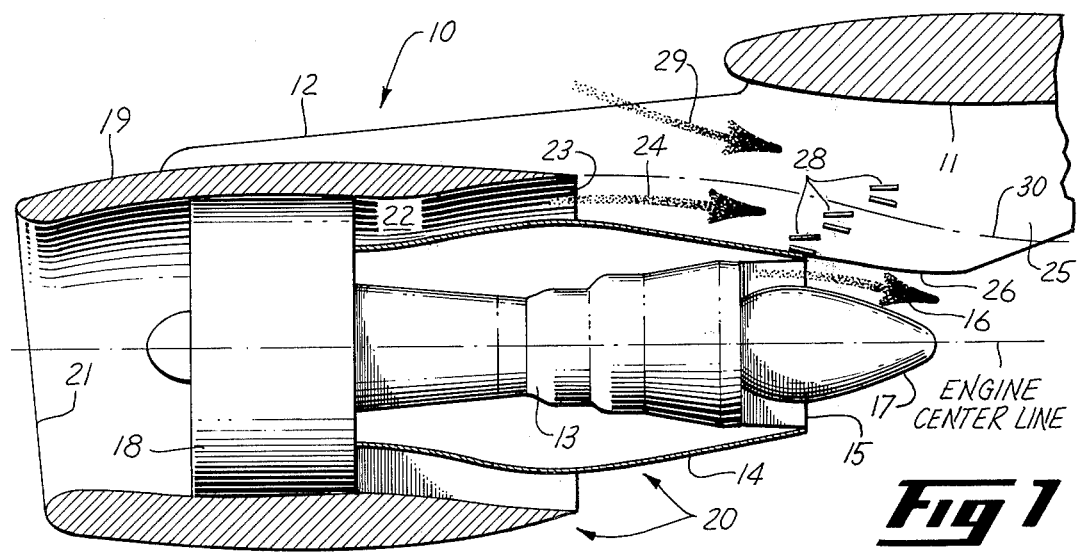
FIG. 1 is a partly sectioned inboard side view of a wing mounted nacelle and turbofan engine illustrating one embodiment of the invention.

FIG. 1 illustrates a nacelle installation comprising a high-bypass, separate-flow gas turbine, or turbofan, engine 10 suitably mounted below and partially forward of an aircraft wing 11 by means of a highly swept pylon 12.

The engine 10 comprises a core engine 13 having a compressor, combustor and power turbine (not shown) arranged coaxially and in an axially spaced, serial flow relationship. The core engine 13 is enclosed within an annular casing or core cowl 14 having a downstream end defining an annular core exhaust nozzle 15 through which combustion products, or hot core exhaust gases 16, can be discharged to produce thrust. A substantially frusto-conical core nozzle center body or plug 17 is coaxially spaced within and extends aft of the exhaust nozzle 15 and is effective for increasing the aerodynamic performance of the exhaust gases 16 flowing between its outer surface and the inner surface of exhaust nozzle 15.

According to the present invention, means are provided for constraining the hot exhaust gases 16 being discharged from the core exhaust nozzle 15 for reducing the flow thereof over the trailing portion of pylon 12 and thereby reducing any undesirable effects therefrom. The constraining means cooperate with the exhaust gases 16, the core exhaust nozzle 15, the pylon 12 and the relatively cool air being discharged from a fan assembly of turbofan engine 10 in a manner described below.

More specifically, a fan assembly 18, which provides additional thrust, is mounted upstream of the core engine 13 and is driven by the power turbine thereof. Enclosing the fan assembly 18 is an aerodynamically contoured, annular fan cowl 19 which in combination with core cowl 14 defines the engine nacelle 20. The fan cowl 19 comprises an upstream end defining a fan inlet 21, an intermediate section coaxially spaced about the core cowl 14 and jointly cooperating therewith for defining a bypass duct or passageway 22, and a downstream end defining an annular fan outlet 23.

In operation, relatively cool, ambient air is drawn through fan inlet 21 of the upstream end of the fan cowl 19 and is accelerated by the fan assembly 18 with a portion of the air being supplied to the core engine 13 for supporting combustion therein. The remainder of the air, or bypass airflow 24, flows through bypass duct 22 and is normally discharged in the axial downstream direction through the fan outlet 23.

The turbofan engine 10 is a high bypass ratio machine inasmuch as the ratio of mass flow of fluid in the bypass duct 22 to the core engine 13 is relatively high. Furthermore, a substantial amount of energy is extracted from the hot combustion gases 16 in driving the power turbine of the core engine 13 and therefore a substantial portion of the total thrust generated by the turbofan engine 10 is provided by the bypass stream of air 24 being discharged from the fan outlet 23. The construction and operation of high bypass, turbofan engines is known in the art, and for example, as generally disclosed in U.S. Pat. No. 3,806,067—Kutney, incorporated herein by reference, and accordingly further description thereof is not required for the detailed description of the present invention.

However, improvements in performance of jet aircraft have been realized by removing the core nozzle thrust reverser and cowling combination usually provided for and utilized on such engines. A reduction in length of the core exhaust nozzle of approximately two feet can thereby be attained. This assembly, defined as the short core exhaust nozzle, results in improved performance of the turbofan engine such as reduced internal core nozzle pressure losses, reduced core cowl scrubbing drag and a reduction of weight. A turbofan engine incorporating a short core exhaust nozzle assembly is disclosed in U.S. Pat. No. 4,238,092—Brennan and AIAA Paper-80-1196, CF6-50 Short Core Exhaust Nozzle by D. J. Dusa et al., both incorporated herein by reference. The core exhaust nozzle 15 of gas turbine engine 10 as illustrated in FIG. 1 is such a short core exhaust nozzle.

The use of a turbofan engine having a short core exhaust nozzle, and a highly swept supporting pylon therefor result in improved aerodynamic performance of a jet aircraft. More specifically, the pylon 12 is designed for supporting the engine 10 below and partially forward of the wing 11 for improved aerodynamic performance.

The pylon 12 has an aerodynamically smooth contour and includes a trailing portion 25 defined as that portion extending aft relative to the exit of exhaust nozzle 15. The pylon 12 further includes a pylon shelf portion 26 in the trailing portion 25 thereof. The pylon shelf 26 is located at the lowermost portion of the trailing portion 25 and, for increased performance of the engine, it preferably extends aft of the exhaust nozzle 15 and is aligned at a small angle downwardly with respect to the engine longitudinal, or axial, centerline. More specifically, the pylon shelf 26 is preferably aligned parallel to the streamlines of the hot exhaust gases 16 which are discharged from the exhaust nozzle 15. The lower surface of the pylon shelf 26 is spaced above the outlet of the exhaust nozzle 15 and the core plug 17 and defines a partial upper boundary for partially constraining the hot exhaust gases exiting aft of the exhaust nozzle 15.

Additionally, the placement of the engine nacelle 20 under the wing 11 results in pressure gradients and interference between the nacelle 20, the pylon 12, the wing 11, and the aircraft fuselage (not shown). These pressure gradients are most pronounced on the inboard side of the nacelle and pylon, i.e., the side facing toward the aircraft fuselage, and comprise a region of relatively lower pressure located adjacent the pylon 12 and above the nacelle 20. The pressure field between the nacelle 20 and the wing 11 is lower on the inboard side of the pylon 12 than on the outboard side thereof, i.e., the side facing outwardly from the aircraft fusalage, and is a significant source of aerodynamic performance loss.

Furthermore, in operation and during take-off, for example, the velocity of the fan bypass airflow 24 and exhaust gases 16 being discharged from the fan outlet 23 and the core exhaust nozzle 15, respectively, are substantially subsonic. During climb-out and cruise conditions, however, the bypass airflow 24 and core exhaust gases 16 flow at supersonic speeds of approximately Mach number 1.25 to approximately 1.4. During supersonic fluid flow, shock waves exist along the surface of the pylon 12 near the exit of the exhaust nozzle 15 adjacent the pylon shelf 26.

Although the use of a shorter turbofan and nacelle, such as the short core exhaust nozzle arrangement, and a highly swept pylon having a shelf and trailing portion disposed over the core engine discharge area results in increased aerodynamic performance of the aircraft, hot exhaust gas upwash over the pylon also can result. More specifically, the exhaust nozzle 15 discharges the hot exhaust gases 16 just below the pylon shelf 26 and trailing portion 25 of the pylon 12. The exhaust gases 16, therefore, can flow upwardly around the pylon shelf 26 and over both the inboard and outboard sides of the trailing portion 25 of pylon 12.

Furthermore, the shock waves in conjunction with the nacelle and pylon region pressure gradients as above-described can induce and further extend any flow separation of the air flowing over the pylon 12 and allow the upwash of the hot core exhaust gases 16 from nozzle 15 to extend even higher over the pylon 12.

In the absence of the present invention exhaust gas upwash over the trailing portion 25 of pylon 12, especially over the inboard side thereof, can result in heating of the pylon surface, or panel members 27 (shown in FIGS. 2, 3 and 4) which can lead to a shortened service life thereof. More specifically, and for example, where the pylon panels 27 comprise fiberglass for reducing aircraft weight, the upwash can decrease the fatigue strength of the panels 27 and in conjunction with the flow separation can result in flow induced vibration of the pylon panels 27 and increased drag over the pylon 12. Accordingly, the flow separation and hot exhaust gas upwash additionally can reduce the aerodynamic performance and efficiency of the nacelle, pylon and wing assembly.

According to one form of the present invention, means are provided in combination with the nacelle and pylon installation assembly which are effective for constraining the exhaust gases 16 from the exhaust nozzle 15 for reducing the flow thereof over the trailing portion 25 of the pylon 12 and thereby reducing hot exhaust gas upwash and increasing the aerodynamic performance of the aircraft. The means effective for constraining the exhaust gases can be disposed downstream or aft of the fan outlet 23 and adjacent the core exhaust nozzle 15 and pylon shelf 26. The means are effective for directing the exhaust gases 16 away from the trailing portion 25 of the pylon 12.

More specifically, illustrated in FIG. 1 is one embodiment of the invention which comprises means for reducing airflow separation at the surface of the trailing portion 25 of the pylon 12. One manner of reducing airflow separation is by reducing the boundary layer of air flowing over the pylon 12. The means can comprise a plurality of spaced vortex generators 28 extending outwardly from the lateral surface of the inboard side of pylon 12 along a predetermined inclined line. Although vortex generators are shown, other suitable means for reducing the boundary layer, such as suction slots, also can be used.

Figure 2:
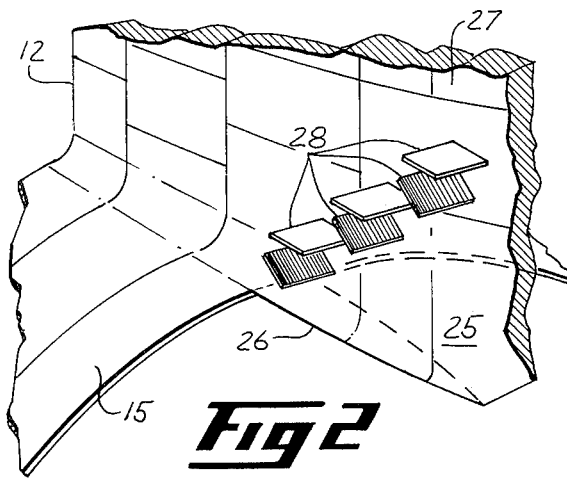
FIG. 2 is a fragmentary perspective view illustrating in more detail the vortex generator embodiment shown in FIG. 1.

Illustrated in more detail in FIG. 2 are the vortex generators 28 as shown in FIG. 1. The vortex generators 28 comprise a plurality of relatively small, outwardly projecting airfoils or vanes mounted on the surface of the pylon 12 at predetermined intervals along the pylon surface.

Preferably, the vortex generators 28 are arranged along an inclined line extending aft of the core exhaust nozzle 15 and upwardly toward the wing 11. The number of vortex generators 28 utilized and the spacing thereof is predetermined considering the particular airflow field which exists between the nacelle 20 and the wing 11. As illustrated in FIG. 1 some of the vortex generators 28 can be positioned in freestream, or ambient airflow 29. The intersection streamline between the bypass airflow 24 and the freestream airflow 29 is indicated approximately at 30.

Furthermore, the individual vanes 28 extend perpendicularly outwardly from the pylon lateral surface and each is oriented at a small acute angle relative to the streamlines of the respective rearwardly proceeding bypass airflow 24 and freestream airflow 29.

In operation, the vortex generators 28 create vortices which swirl in planes parallel to the pylon surface and materially reduce the boundary layer of both the freestream airflow 29 and bypass airflow 24. More particularly, the vortex generators reduce the separation of the bypass airflow 24 from the pylon surface and accordingly are effective for constraining the exhaust gases 16 by maintaining the relatively cool fan bypass airflow 24 attached to the pylon 12 and thereby providing a cool air boundary with the hot core exhaust gases 16.

As more particularly shown in FIGS. 1 and 2, the vortex generators can be preferably arranged in air counter-rotating pairs, three for example, for improving the ability of the vortex generators to reduce flow separation from the pylon 12 and thereby reduce upwash over the trailing portion 25.

Although the aircraft flies at subsonic speeds, the bypass airflow 24 being discharged from the fan outlet 23 can flow at supersonic speeds such as during cruising speeds of the aircraft as above-described. Some of the vortex generators 28 therefore are subject to supersonic flow thereover. The use of vortex generators in the supersonic flow region of the trailing portion 25 of pylon 12 can cause shock waves thereabout and result in increased drag therefrom. However, the reducing of hot exhaust gas upwash and an increase in overall nacelle and aircraft performance which can be realized from their use offsets any resultant increase in drag therefrom. Furthermore, inasmuch as the vortex generators 28 are arranged along a line extending aft and upwardly from near the exit of the exhaust nozzle 15 they are thereby effective for reducing any oblique shock waves therebetween and any resulting drag therefrom.

Figure 3:
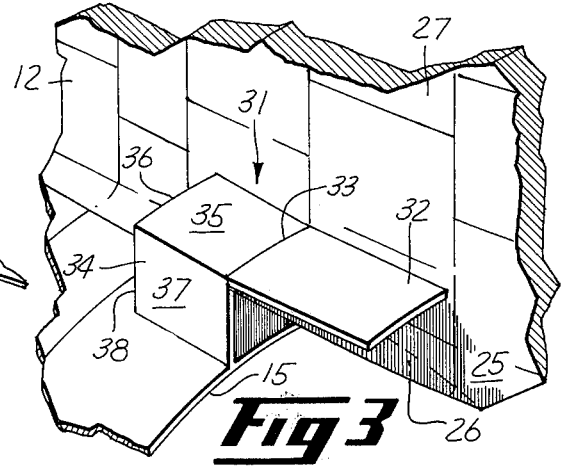
FIG. 3 is a fragmentary perspective view illustrating a second embodiment of the invention, or pylon ejector, which can be used alternatively to the vortex generators shown in FIG. 1.

According to another embodiment of the invention as illustrated in FIG. 3, a pylon ejector 31 is provided as an alternative to the vortex generators 28 as shown in FIG. 1. The pylon ejector 31 is effective for constraining the exhaust gases 16 from the core exhaust nozzle 15 to reduce the flow thereof over the trailing portion 25 of the pylon 12.

The pylon ejector 31 comprises a preferably arcuate baffle plate 32 extending laterally outwardly from the pylon 12 and substantially parallel to and spaced from the pylon shelf 26. The baffle plate 32, when used alone, has an aerodynamically sharp leading edge 33 disposed adjacent to and spaced above the exhaust nozzle 15 for engaging the bypass airflow 24. The baffle plate 32 can be used by itself for channelling and directing bypass airflow 24 from fan outlet 23 between the plate 32 and the exhaust gases 16 from the exhaust nozzle 15. However, it is preferred that the pylon ejector 31 further comprise an air inlet duct 34 which itself is preferably integral with and disposed at the leading edge 33 of the baffle plate 32, and which is effective for capturing a portion of the fan bypass airflow 24 and directing it to the baffle plate 32.

Although the inlet duct 34 can comprise any suitable structure for defining desired duct section configurations, such as circular for example, it is preferred that the inlet duct 34 comprise structure for defining a substantially rectangular duct section. More specifically, the inlet duct 34 comprises two substantially perpendicular wall sections: a preferably arcuate top wall 35, and a sidewall 37 integral with arcuate topwall 35. The top wall 35 extends outwardly from the inboard lateral surface of pylon 12 and is spaced above the nozzle 15. The top wall 35 further includes a downstream edge preferably integral with the leading edge 33 of the baffle plate 32 and an upstream end 36 defining an aerodynamically sharp edge. The sidewall 37 extends radially inwardly to the outer surface of the exhaust nozzle 15 and has an upstream end 38 defining an aerodynamically sharp edge.

The inlet duct 34 in combination with the surfaces of exhaust nozzle 15 and pylon 12 defines a substantially rectangular duct for capturing a portion of the bypass airflow 24 from fan outlet 23 and directing the airflow between baffle plate 32 and the exhaust gases 16 from exhaust nozzle 15. The directed airflow is effective for providing a cool air boundary between the trailing portion 25 of pylon 12 and the hot exhaust gases 16 of the exhaust nozzle 15. The pylon ejector 31 is thereby effective for constraining the core exhaust gases 16 and reducing any upwash thereof over the pylon trailing portion 25.

The optimum size of the pylon ejector 31, contours of the elements thereof, and relative position with respect to the core exhaust nozzle 15 and pylon 12 is predetermined from considering the local flowfield characteristics and degree of upwash elimination required. Where the degree of upwash is relatively small, baffle plate 32 having a sharp upstream leading edge 33 alone can be effective for reducing any upwash.

Figure 4:
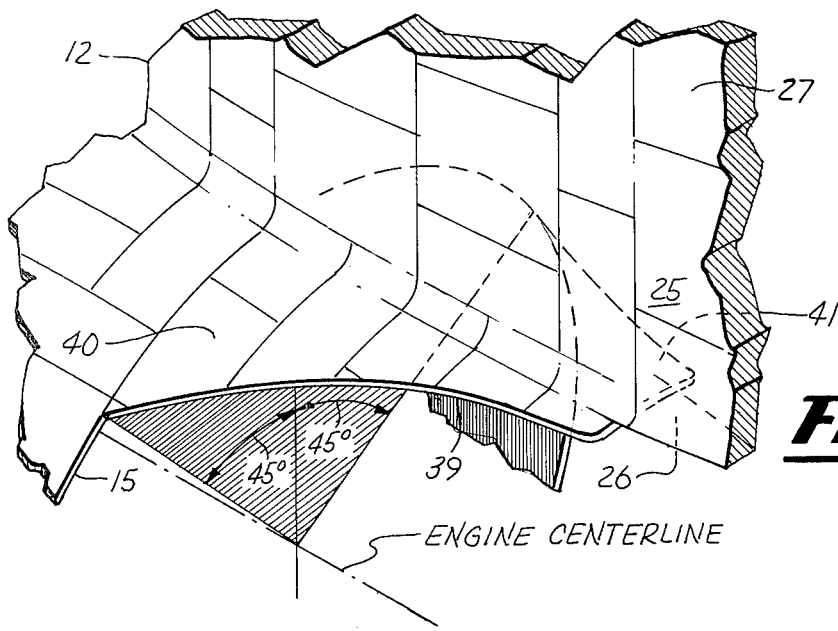
FIG. 4 is a fragmentary perspective view illustrating a third embodiment of the invention, or core nozzle shroud, which can be used alternatively to the vortex generators shown in FIG. 1.

Illustrated in FIG. 4 is another embodiment of the invention comprising a core nozzle shroud 39 which also can be used as an alternative to the vortex generators 28 as shown in FIG. 1. The core nozzle shroud 39 is effective for constraining the exhaust gases 16 from the nozzle 15 to reduce the flow thereof over the trailing portion 25 of the pylon 12.

More specifically, the core nozzle shroud 39 extends aft of the exhaust nozzle 15 in substantially coaxial alignment therewith and has a portion extending circumferentially outwardly from the pylon 12 for defining barrier means against the exhaust gases 16 flowing from the core exhaust nozzle 15.

The core nozzle shroud 39 preferably comprises portions extending circumferentially outwardly from opposite sides of the pylon 12 such as, for example, an arcuate, rearwardly tapered plate member mounted on the exhaust nozzle 15 and disposed against and below the pylon shelf 26. The portions comprise an inboard portion 40 and an outboard portion 41, which portions extend symmetrically about the pylon shelf 26. Preferably, the core nozzle shroud 39 circumferentially extends approximately 45° to both sides of the pylon 12 and is disposed coaxial with the engine longitudinal centerline. The core nozzle shroud 39 in cooperation with the bypass airflow 24 from fan outlet 23 and the exhaust gases 16 from core exhaust nozzle 15 is effective for constraining the exhaust gases 16 and reducing upwash thereof over both the inboard and outboard surfaces of the trailing portion 25 of pylon 12.

Alternatively, the core nozzle shroud 39 can be mounted to or formed integral with the pylon 12 such as with the pylon shelf 26 thereof and aligned with the exhaust nozzle 15. The core nozzle shroud 39 also can comprise one or two sections disposed on one or both sides of the pylon shelf 26 of pylon 12 for reducing upwash over the inboard or outboard, or both, surfaces of pylon 12.

While there has been described herein what is considered to be preferred embodiments of the invention, other modifications will occur to those skilled in the art after having considered the present disclosure. Accordingly, it is desired to secure by the appended claims, all modifications falling within the true spirit and scope of the invention.

What is claimed is:

1. In a nacelle installation for a gas turbine engine in an aircraft which includes a core engine and a core cowl which (1) surrounds the core engine (2) defines a core exhaust nozzle for discharging hot exhaust gases, and which includes a fan driven by the core engine, a fan cowl surrounding the fan and defining, together with the core cowl, an annular outlet for discharging bypass air, and which includes a pylon having a trailing portion extending aft of the core exhaust nozzle, wherein the pylon contains a region which is subject to the hot exhaust, wherein a freestream airflow flows generally parallel with the bypass airflow, and wherein an intersection streamline is definable at the intersection of the freestream airflow and the bypass airflow, the improvement comprising:
   (a) vortex generators for maintaining a cooling layer of relatively cool air between the relatively hot engine exhaust and the pylon, the vortex generators extending from the pylon and positioned such that
      (i) some are located in a supersonic flow region and generate shock waves which increase aerodynamic drag;
      (ii) some are located aft and upward of the exhaust nozzle of the engine for reducing oblique shock waves between the vortex generators and the exhaust nozzle, thereby reducing drag induced by the oblique shock waves.

2. The improvement according to claim 1 in which some of the vortex generators are located above the intersection streamline and in the freestream airflow.

3. The improvement according to claim 2 in which the vortex generators comprise vanes which are oriented at small acute angles relative to the streamline passing the vortex generators.

* * * * *